(12) United States Patent
Zhou et al.

(10) Patent No.: US 9,025,121 B2
(45) Date of Patent: May 5, 2015

(54) PIXEL UNIT COMPRISING AN INCLINED CONNECTION PART AND ARRAY SUBSTRATE OF A LIQUID CRYSTAL DISPLAY DEVICE WITH A FRINGE FIELD SWITCHING MODE

(71) Applicant: Xiamen Tianma Micro-Electronics Co., Ltd., Xiamen (CN)

(72) Inventors: Ting Zhou, Xiamen (CN); Boping Shen, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 14/079,559

(22) Filed: Nov. 13, 2013

(65) Prior Publication Data

US 2014/0240629 A1 Aug. 28, 2014

(51) Int. Cl.
*G02F 1/1343* (2006.01)
*G02F 1/1337* (2006.01)

(52) U.S. Cl.
CPC .... *G02F 1/134309* (2013.01); *G02F 1/134363* (2013.01); *G02F 2001/13373* (2013.01); *G02F 2001/134372* (2013.01)

(58) Field of Classification Search
USPC ................................. 349/132, 141
See application file for complete search history.

(56) References Cited

U.S. PATENT DOCUMENTS 6,459,464 B1 * 10/2002 Nakasima et al. ............ 349/141
2011/0176100 A1 * 7/2011 Nishida et al. ............... 349/143

* cited by examiner

*Primary Examiner* — Paul Lee
(74) *Attorney, Agent, or Firm* — Kilpatrick Townsend & Stockton LLP

(57) ABSTRACT

Embodiments of the invention disclose a pixel unit and an array substrate of an LCD device with an FFS mode; the pixel unit includes a pixel electrode and a common electrode insulated from each other, the pixel electrode includes at least two branch electrodes arranged in parallel and an end electrode connecting to ends of the branch electrodes; the branch electrode includes a body and an inclined connection part, the inclined connection part is connected between an end of the body and the end electrode, and extends in a direction different from extension direction of the body; at least one of the branch electrodes includes a protrusion at an end of the body; the protrusion is arranged opposite to the end electrode along the extension direction of the body. Embodiments of the invention can suppress the DLS phenomenon at the edge of the pixel unit, thereby improving display performance.

10 Claims, 10 Drawing Sheets

US 9,025,121 B2

PIXEL UNIT COMPRISING AN INCLINED CONNECTION PART AND ARRAY SUBSTRATE OF A LIQUID CRYSTAL DISPLAY DEVICE WITH A FRINGE FIELD SWITCHING MODE

CROSS-REFERENCES TO RELATED APPLICATIONS

This application claims priority of Chinese Patent Application No. 201310059824.1, filed with the Chinese Patent Office on Feb. 26, 2013 and entitled "PIXEL UNIT AND ARRAY SUBSTRATE OF LIQUID CRYSTAL DISPLAY DEVICE WITH A FRINGE FIELD SWITCHING MODE", the contents of which is incorporated herein by reference in its entirety.

TECHNICAL FIELD

The present invention relates to the field of liquid crystal display technologies, in particular to a pixel unit and an array substrate of a liquid crystal display device with a Fringe Field Switching (FFS) mode.

BACKGROUND OF THE INVENTION

In the Thin Film Transistor Liquid Crystal Display (TFT-LCD) product, the FFS technology can increase an aperture ratio and transmittance of a liquid crystal display device with an In-Plane-Switching (IPS) mode.

A liquid crystal display device with an FFS mode includes a common electrode and a pixel electrode, which are separated by an insulation layer and arranged overlapped, and a distance between the common electrode and the pixel electrode is controlled to be less than a distance between an upper glass substrate and a lower glass substrate, so as to form a fringe field between the common electrode and the pixel electrode, so that liquid crystal molecules above the pixel electrode can be controlled, and the defect that the liquid crystal molecules are uncontrollable due to the vertical electric field right above the pixel electrode in the traditional IPS liquid crystal display device can be overcome, thereby increasing the aperture ratio and the transmittance of the liquid crystal display device greatly.

FIG. 1a is a schematic top view of a pixel unit of a liquid crystal display device with the FFS mode in the prior art. FIG. 1b is a schematic sectional view of the pixel unit of the liquid crystal display device with the FFS mode along a line A-A' in FIG. 1a in the prior art. As shown in FIGS. 1a and 1b, a pixel unit 10 includes a pectinate pixel electrode 11, a planar common electrode 12, and an insulation layer 13 disposed between the pectinate pixel electrode 11 and the planar common electrode 12. The pixel electrode 11 includes a plurality of branch electrodes 111 arranged in parallel and end electrodes 112 connecting to ends of the branch electrodes 111, where, the lower end electrode is used to connect the pixel electrode to a switching device. After a voltage is applied between the pixel electrode 11 and the common electrode 12, an electric field component $E_Y$ is formed by the end electrodes 112 and the common electrode 12 in a Y direction (i.e. a direction in which the branch electrodes extend). The existence of such electric field component causes the arrangement instability of the liquid crystal molecules at the edge of the pixel unit, in particularly, the electric field component in the Y direction affects a rotation direction of the liquid crystal molecules in a X-Y plane, thereby causing a Disclination Lines (DLS) phenomenon.

FIG. 2 is a schematic top view of a pixel unit of another existing liquid crystal display device with the FFS mode in the prior art. As shown in FIG. 2, a pixel unit includes a pixel electrode 21 and a common electrode 22 which are insulated with each other. The pixel electrode 21 includes branch electrodes 211 and end electrodes 212, where the lower end electrode is used to connect the pixel electrode to a switching device. The branch electrode includes a body 211a, and an inclined connection part 211b connected between an end of the body 211a and the end electrode 212, and the extension direction of the inclined connection part 211b is different from that of the body 211a, thereby forming an angle between the inclined connection part 211b and the body 211a. Due to the existence of the inclined connection part 211b at an end of the branch electrode 21, the electric field component $E_Y$ formed by the end electrode 112 and the common electrode 12 in the Y direction (i.e. the extension direction of the strip electrode) can be reduced in a certain degree, to suppress the DLS phenomenon at the end of the pixel unit. The suppression of the DLS phenomenon by the pixel unit can be adjusted by adjusting the angle between the body 211a and the inclined connection part 211b as well as a length of the inclined connection part 211b during a design stage. However, the suppression of the DLS phenomenon by the pixel unit in such structure is still limited, and the display performance of an array substrate is significantly affected due to a poor press present in a central region of a pixel when the pixel is pressed.

BRIEF SUMMARY OF THE INVENTION

An aspect of the present invention discloses a pixel unit of a liquid crystal display device with the FFS mode, and the pixel unit includes a pixel electrode and a common electrode which are insulated from each other;

the pixel electrode includes at least two branch electrodes arranged in parallel and an end electrode connecting to ends of the branch electrodes;

the branch electrode includes a body and an inclined connection part, where the inclined connection part is connected between an end of the body and the end electrode, and extends in a direction different from the extension direction of the body;

at least one of the branch electrodes further includes a protrusion at an end of the body;

the protrusion is arranged opposite to the end electrode along the extension direction of the body.

Another aspect of the present invention discloses an array substrate of a liquid crystal display device with a Fringe Field Switching mode, including:

gate lines and data lines intersecting with the gate lines, the gate lines and the data lines defining pixel regions;

switch devices arranged at intersection positions of the gate lines and the data lines;

a pixel electrode located in the pixel region; and a common electrode covering the array substrate, where the pixel electrodes are insulated from the common electrode;

the pixel electrode includes at least two branch electrodes arranged in parallel and an end electrode connecting to ends of the branch electrodes;

the branch electrode includes a body and an inclined connection part, wherein, the inclined connection part is connected between an end of the body and the end electrode, and the inclined connection part and the body extend in different directions;

at least one of the branch electrodes includes a protrusion located at an end of the body, and the protrusion is arranged opposite to the end electrode along the extension direction of the body.

DETAILED DESCRIPTION OF THE PREFERRED EMBODIMENTS

The technical solutions of the embodiments of present invention are further described by the following embodiments in conjunction with the accompanying drawings.

Figure 1A:
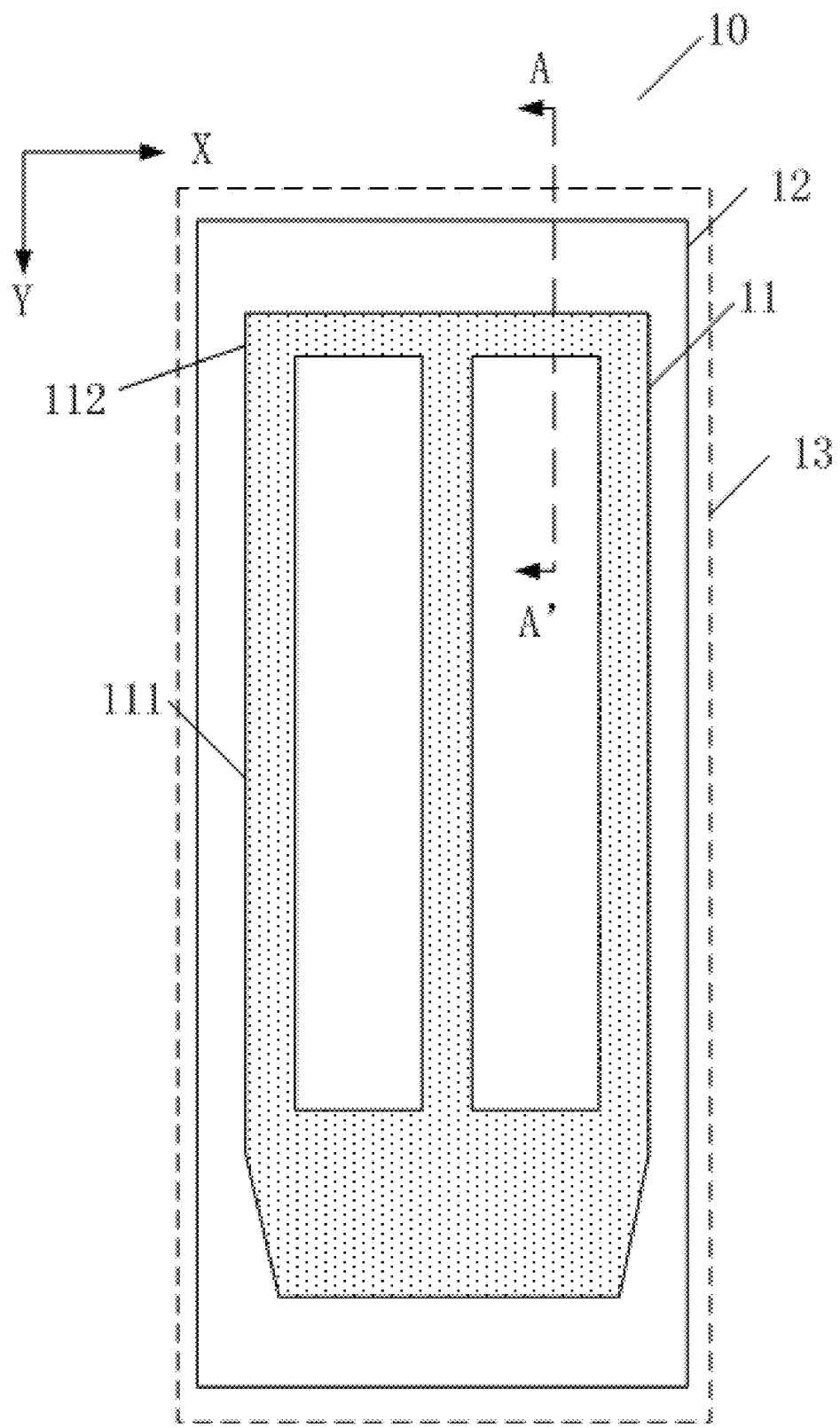
FIG. 1a is a schematic top view of a pixel unit of a liquid crystal display device with the FFS mode in the prior art.
Figure 1B:
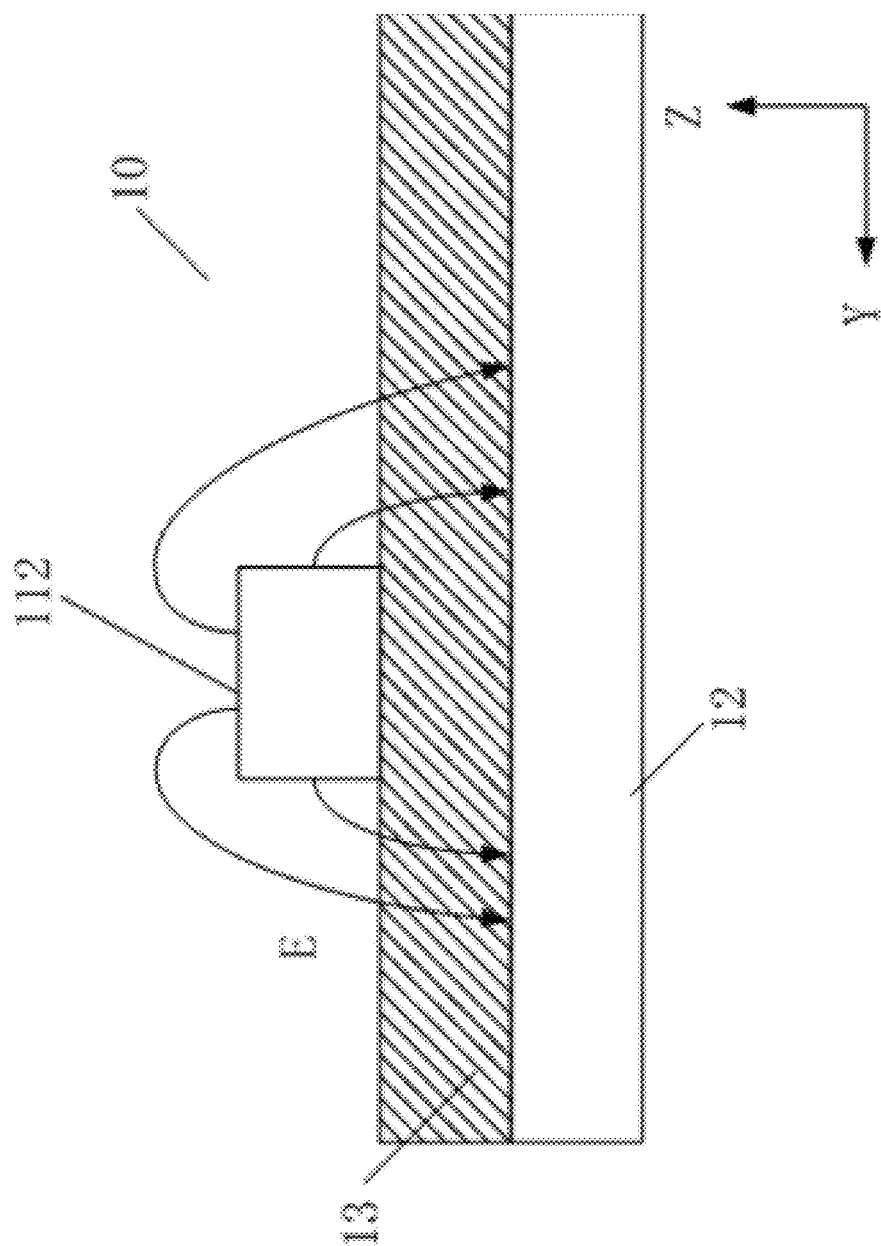
FIG. 1b is a schematic sectional view of the pixel unit of the liquid crystal display device with the FFS mode along a line A-A' in FIG. 1a in the prior art.
Figure 2:
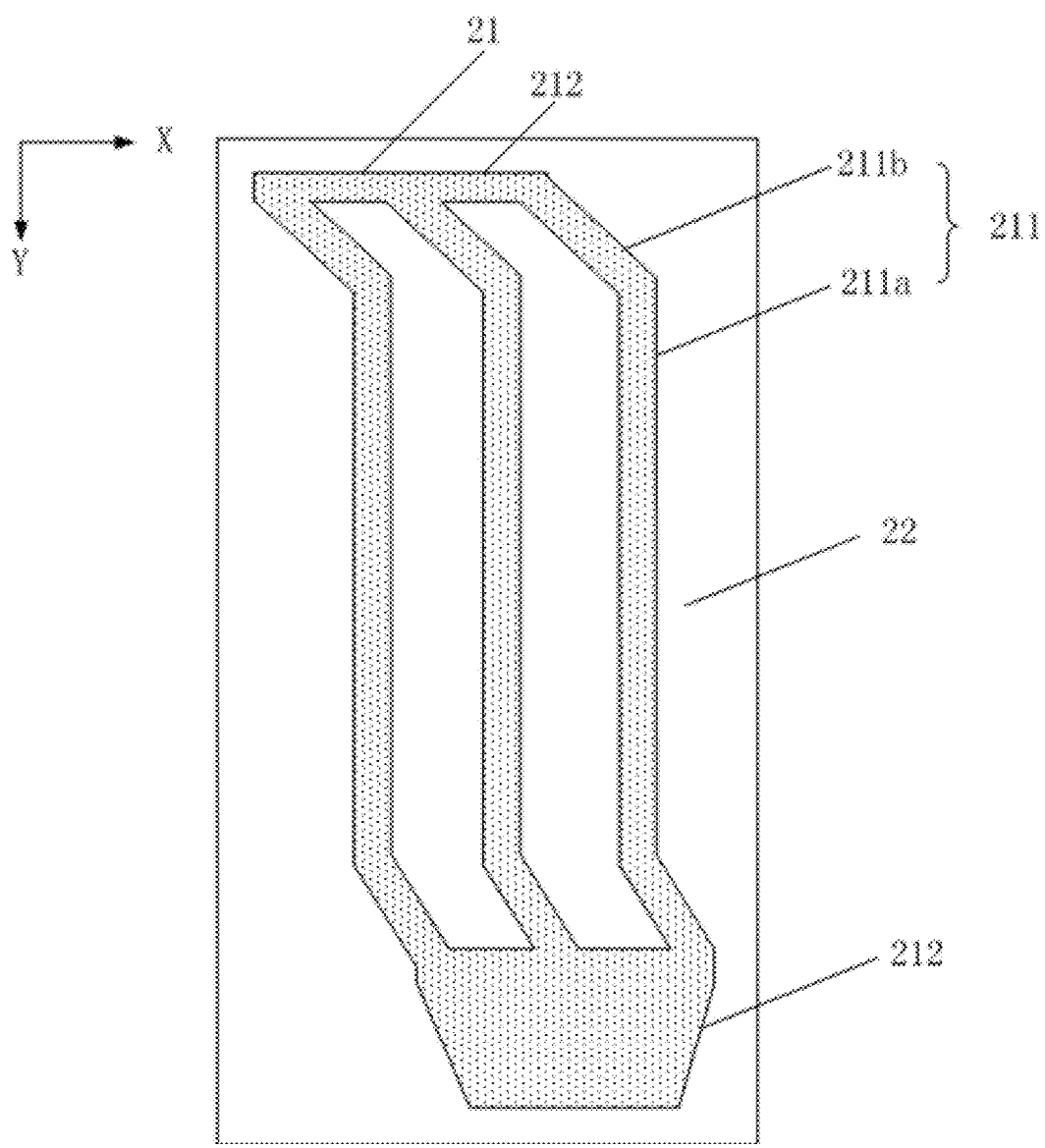
FIG. 2 is a schematic top view of a pixel unit of another liquid crystal display device with the FFS mode in the prior art.
Figure 3A:
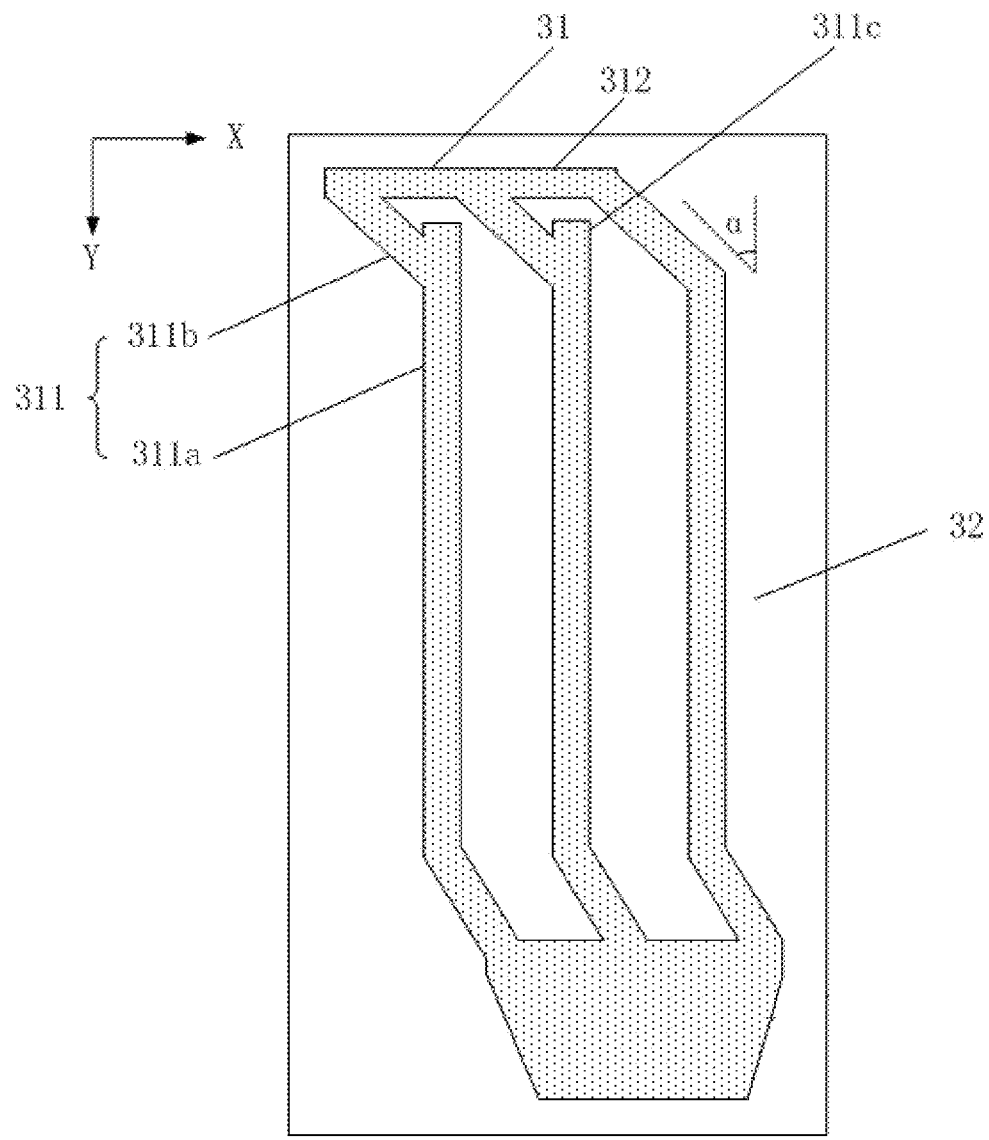
FIG. 3a is a schematic view of a pixel unit of a liquid crystal display device with the FFS mode according to a first embodiment of the invention.

FIG. 3a is a schematic top view of a pixel unit of a liquid crystal display device with the FFS mode according to a first embodiment of the invention. As shown in FIG. 3a, a pixel unit includes a pixel electrode 31 and a common electrode 32, which are insulated from each other.

The pixel electrode 31 includes at least two branch electrodes 311 arranged in parallel and an end electrode 312 connecting with ends of the branch electrodes 311;

The branch electrode 311 includes a body 311a, and an inclined connection part 311b connected between an end of the body 311a and the end electrode 312, and the inclined connection part 311b and the body 311a extend in different directions and form an angle α therebetween. Preferably, in the first embodiment, the angle α is less than or equal to 60 degree.

At least one of the branch electrodes 311 further includes a protrusion 311c at an end of the body 311a, and the protrusion 311c is arranged opposite to the end electrode 312 along a direction different from the extension direction of the inclined connection part 311b. In this embodiment, the protrusion 311c and the body 311a of the branch electrode 311 extend in the same direction, i.e., along the same line.

The protrusion 311c, the body 311a and the inclined connection part 311b may be transparent conductive patterns formed integrally on the same plane by a patterning process.

In this embodiment, each of the branch electrodes 311 except the rightmost branch electrode in FIG. 3a includes the protrusion 311c. That is, all the branch electrodes, each of which includes a body 311a with an end opposite to the end electrode 312, are provided with the protrusions 311c. It should be understood by those skilled in the art that if at least one branch electrode has the protrusion 311c, the DLS phenomenon can be suppressed with comparison with the prior art, thus, it is possible to arrange the protrusions 311c for only partial branch electrodes.

Figure 3B:
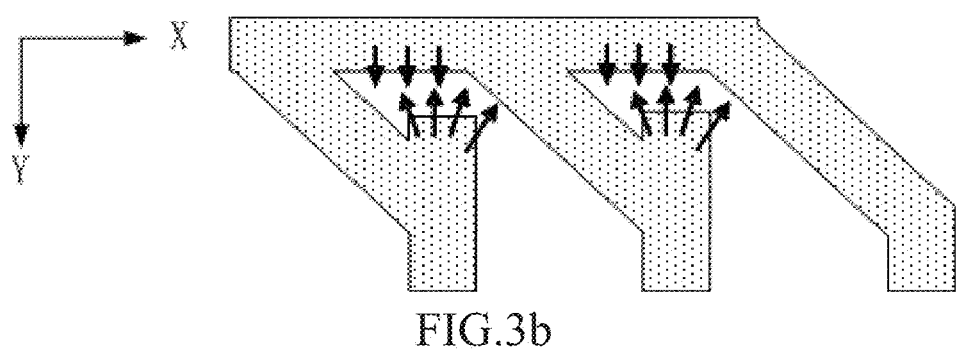
FIG. 3b is a schematic partial view of the pixel unit of the liquid crystal display device with the FFS mode according to the first embodiment of the invention.

FIG. 3b is a schematic partial view of the pixel unit of the liquid crystal display device with the FFS mode according to the first embodiment of the invention. The protrusion and the end electrode, which are arranged opposite to each other, form opposite electric field components in the Y direction (i.e. Y axis) with the common electrode, respectively, and the electric field component in the Y direction formed by the protrusion with the common electrode partially counteracts that formed by the end electrode with the common electrode to decrease the electric field component in the Y direction at an edge region of the pixel unit, thereby suppressing the DLS phenomenon and decreasing area of the region suffering from the DLS phenomenon.

In this embodiment, the common electrode 32 is a planar electrode covering a pixel region. Meanwhile, each of the pixel electrode 31 and the common electrode 32 is a transparent electrode, which may be made of Indium Tin Oxide (ITO), Indium Zinc Oxide (IZO), a combination thereof or other transparent conductive materials. An insulation layer can be disposed between the pixel electrode 31 and the common electrode 32 for insulating (not shown in FIG. 3a or FIG. 3b).

FIG. 4-FIG. 9 compare various simulated parameters of a pixel unit when a certain voltage is applied to the pixel electrode and the common electrode with respect to the structures of the pixel unit in the prior and that in this embodiment.

Figure 4A:
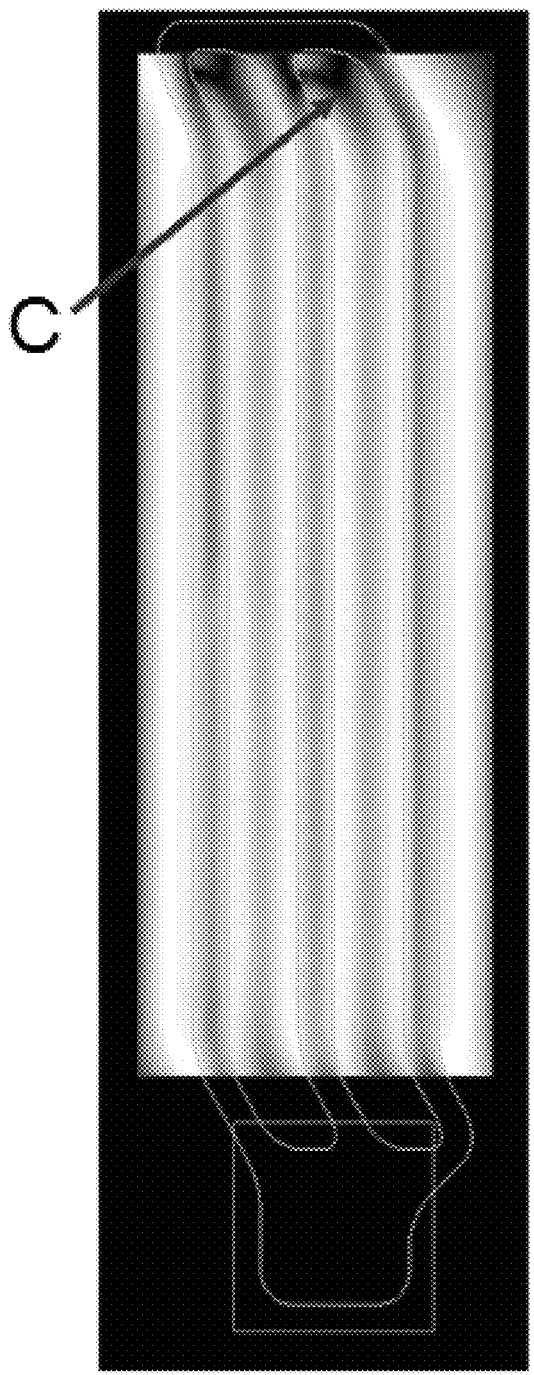
FIG. 4a is a schematic view showing the simulation result of brightness distribution of the pixel unit of the liquid crystal display device with the FFS mode in the prior art when a voltage of 5V is applied.
Figure 4B:
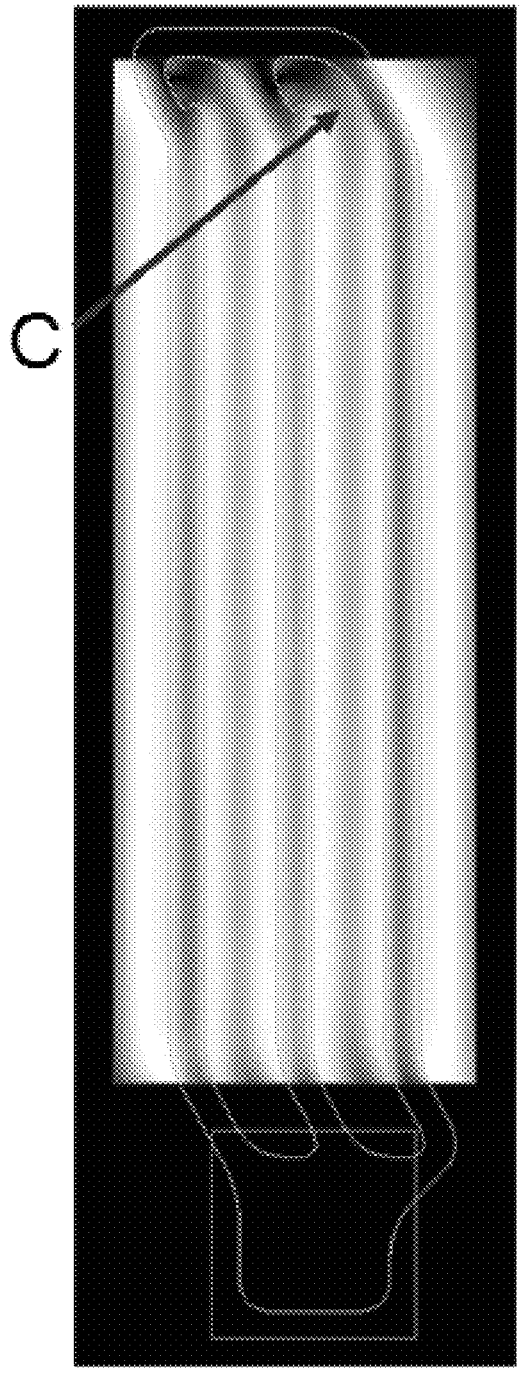
FIG. 4b is a schematic view showing the simulation result of brightness distribution of the pixel unit of the liquid crystal display device with the FFS mode according to the first embodiment of the invention under the same condition (i.e. when a voltage of 5V is applied)

FIG. 4a is a schematic view showing the simulation result of brightness distribution of the pixel unit of the liquid crystal display device with the FFS mode in the prior art when a voltage of 5V is applied. FIG. 4b is a schematic view showing the simulation result of brightness distribution of the pixel unit of the liquid crystal display device with the FFS mode according to the first embodiment of the present invention under the same condition (i.e. when a voltage of 5V is applied). The gray scale at a position in the figures represents the brightness at the position. As can be seen from the comparison between FIG. 4a and FIG. 4b, in the case of the same position C at the edge region of the pixel unit, the brightness of the existing pixel unit at a point C in the position is significantly lower than that at the point C in the position of the pixel unit in this embodiment. Moreover, as can be seen from the comparison, the brightness at the edge region of the pixel unit of this embodiment is uniform, which indicates that the disclination and disorder of the liquid crystal molecules in the pixel unit are reduced greatly. However, the brightness of the existing pixel unit is not uniform at the edge region of the pixel unit, which indicates that the liquid crystal molecules of the existing pixel unit suffer from a serious DLS phenomenon.

Figure 5:
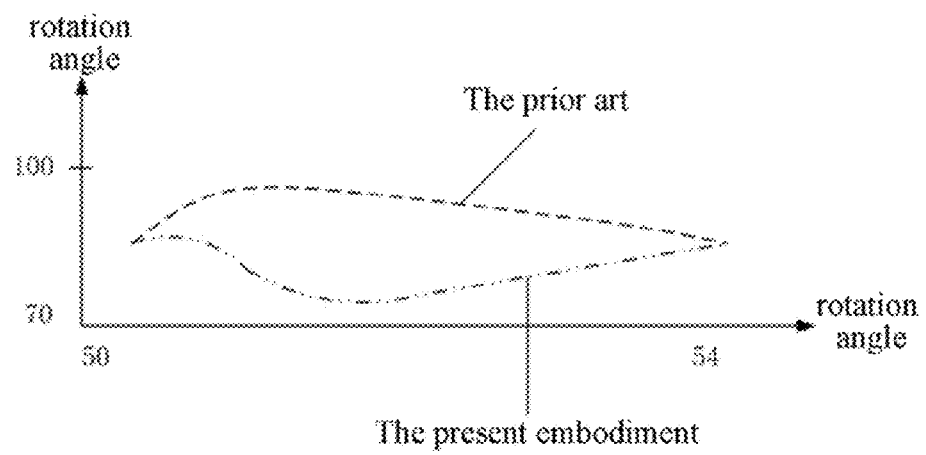
FIG. 5 is a graph of rotation angles of the liquid crystal molecules at a point C of the pixel unit with a variation of the depth from an end of the body to the end electrode along extension direction of the body.

FIG. 5 is a graph of rotation angles of the liquid crystal molecules at the position of the point C in the pixel unit in FIG. 4a or FIG. 4b with a variation of the depth from an end of the body to the end electrode along extension direction of the body. As shown in FIG. 5, the variation tendency of the rotation angle of the liquid crystal molecules at the point C of the existing pixel unit is contrary to that of the liquid crystal molecules at the point C of the pixel unit of this embodiment, which indicates the significant effect of suppressing the DLS phenomenon at the point C in this embodiment.

Figure 6:
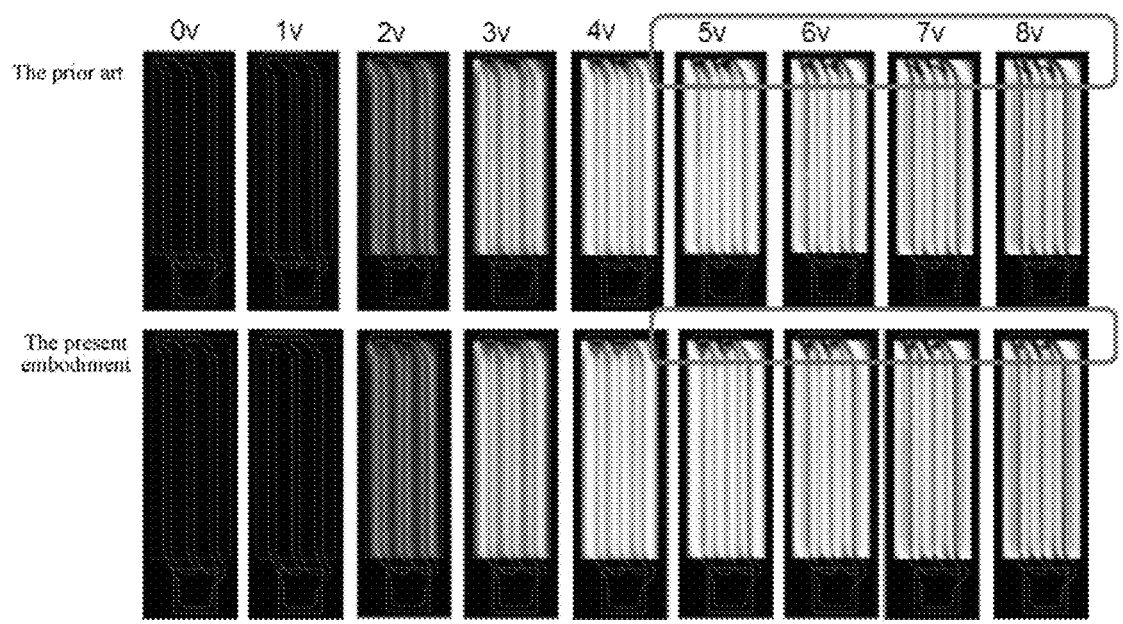
FIG. 6 is a schematic comparison view of brightness distribution of the pixel unit when different voltage are applied between the pixel electrode and the common electrode.
Figure 7:
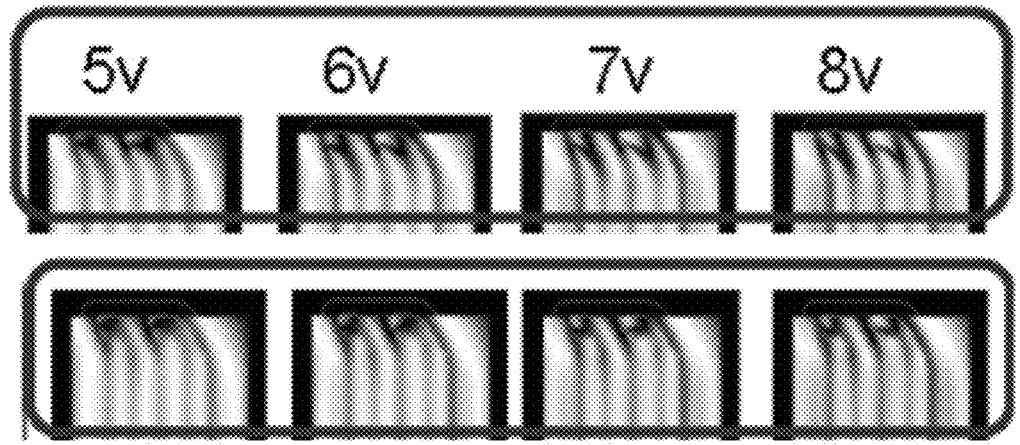
FIG. 7 is a schematic enlarged view of a portion enclosed by a rectangle in FIG. 6.

FIG. 6 is a schematic comparison view of brightness distribution of the pixel unit when different voltages are applied to the pixel electrode and the common electrode. FIG. 7 is a schematic enlarged view of a portion enclosed by a rectangle in FIG. 6. The first row in FIG. 6 represents the brightness distribution of the pixel unit in the prior art under different voltages, and the second row in FIG. 6 represents the brightness distribution of the pixel unit of this embodiment under different voltage. It can be known from FIG. 6 and FIG. 7, an area of the region suffering from the DLS phenomenon can be reduced significantly and the DLS phenomenon at the pixel edge can be suppressed; furthermore, if the voltage is increased, the region suffering from the DLS phenomenon in the prior art extends gradually toward the center of a display region, but the region suffering from the DLS phenomenon in this embodiment almost does not change. As can be seen, in the case of the higher voltage applied, the better effect of suppressing the DLS phenomenon is provided in the present embodiment.

Figure 8:
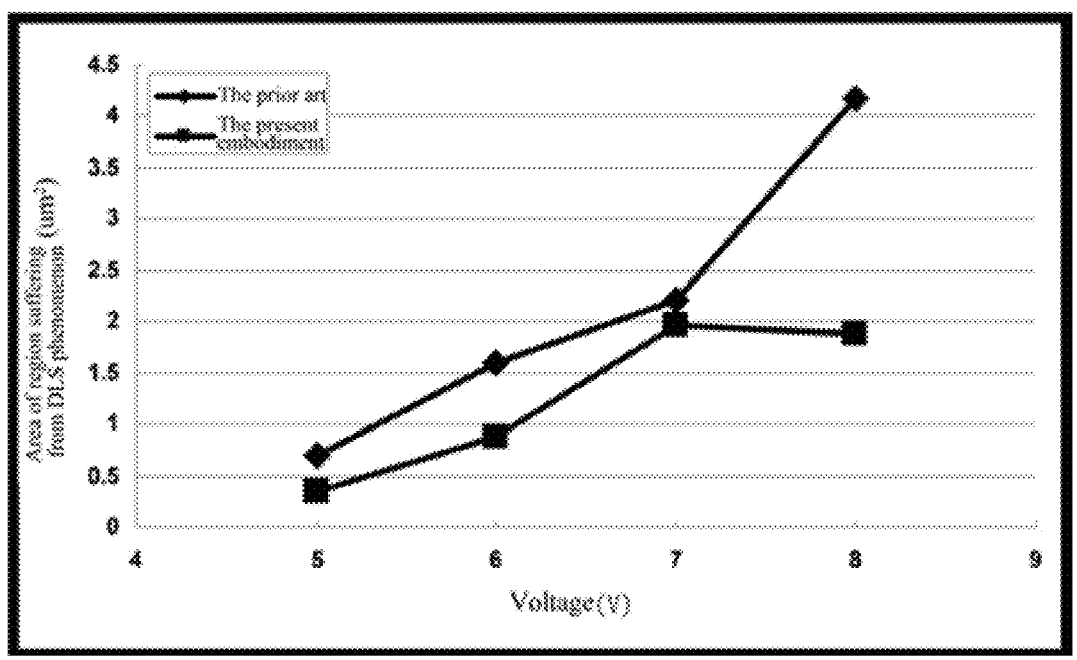
FIG. 8 is a graph comparing an area of the region suffering from the DLS phenomenon in the pixel unit in the prior art and that in the pixel unit in the first embodiment in the case of different voltage.

FIG. 8 is a graph comparing an area of a region suffering from the DLS phenomenon of the pixel unit in the prior art and that of the pixel unit in the first embodiment in the case of different voltages. As shown in FIG. 8, as for the voltage rising from 5V to 8V, an area of the region suffering from the DLS phenomenon of the embodiment is always smaller than that of the pixel unit in the prior art; furthermore, in the case of the larger voltage, the better effect of suppressing the DLS phenomenon is provided in the present embodiment, which is consistent with FIGS. 6 and 7. Corresponding to FIG. 8, the specific values of the areas of the region suffering from the DLS phenomenon of the pixel unit in the art and those of the pixel unit in the embodiment in the case of different voltages are shown as follows.

| Voltages | Area of region suffering from DLS phenomenon (um$^2$) | |
|---|---|---|
| | The prior art | The present embodiment |
| 5 V | 0.702 | 0.354 |
| 6 V | 1.597 | 0.883 |
| 7 V | 2.21 | 1.973 |
| 8 V | 4.166 | 1.889 |

Figure 9:
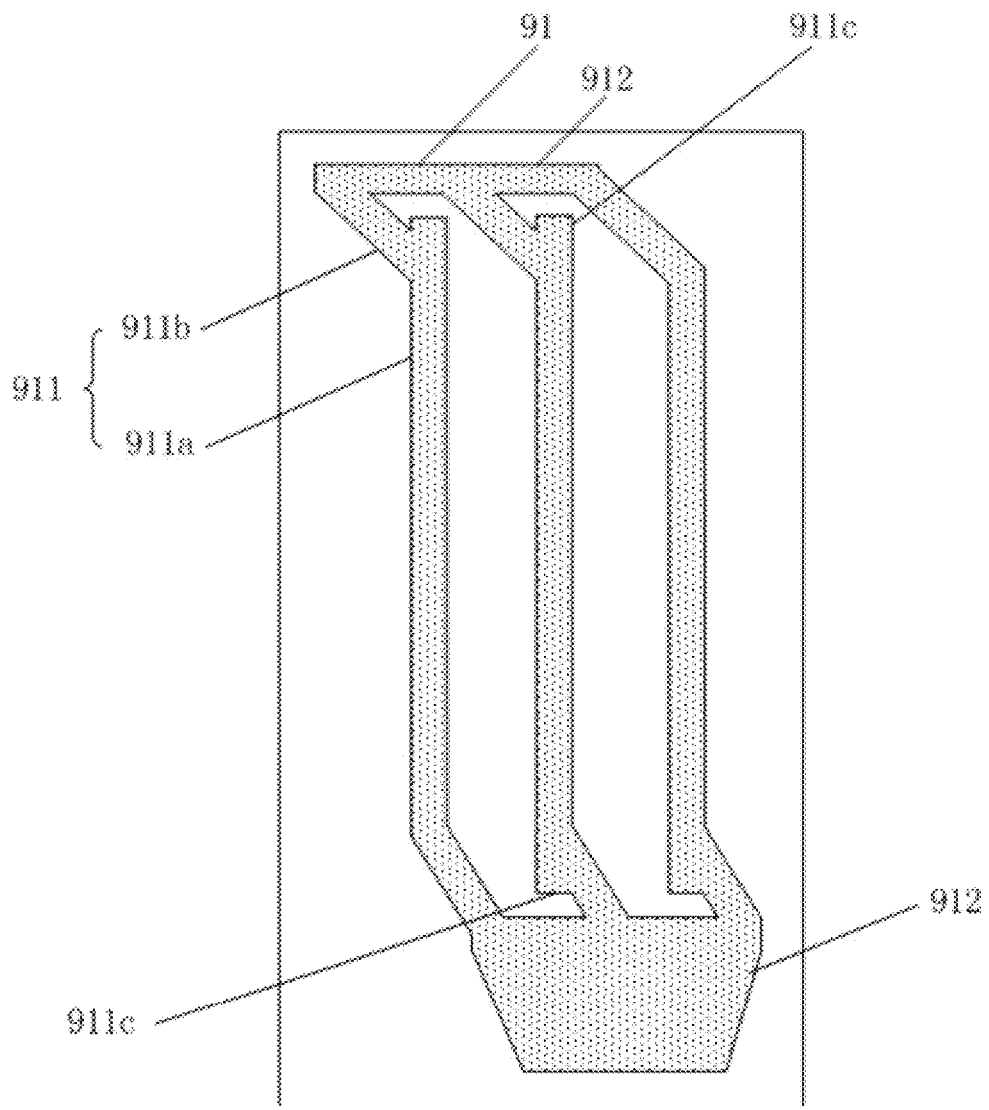
FIG. 9 is a schematic view of a pixel unit of a liquid crystal display device with the FFS mode according to a second embodiment of the invention.

FIG. 9 is a schematic view of a pixel unit of a liquid crystal display device with the FFS mode according to a second embodiment of the invention. As shown in FIG. 9, a pixel electrode 91 of a pixel unit includes at least two branch electrodes 911 and end electrodes 912 connecting to ends of the branch electrodes 911, and the branch electrode 911 includes a body 911a, and an inclined connection part 911b connecting both ends of the body 911a to the respective end electrodes 912. In this embodiment, the body 911a is provided with not only a protrusion 911c at its upper end, but also a protrusion 911 c at its lower end. The protrusions 911c and the body 911a of the branch electrode 911 extend in the same direction, i.e. along the same line.

In the embodiment, an additional protrusion is arranged at the lower end of the body that is connected with the inclined connection part, so that the DLS phenomenon at the lower edge of the pixel unit is suppressed, thereby increasing the aperture ratio of the pixel unit.

Figure 10:
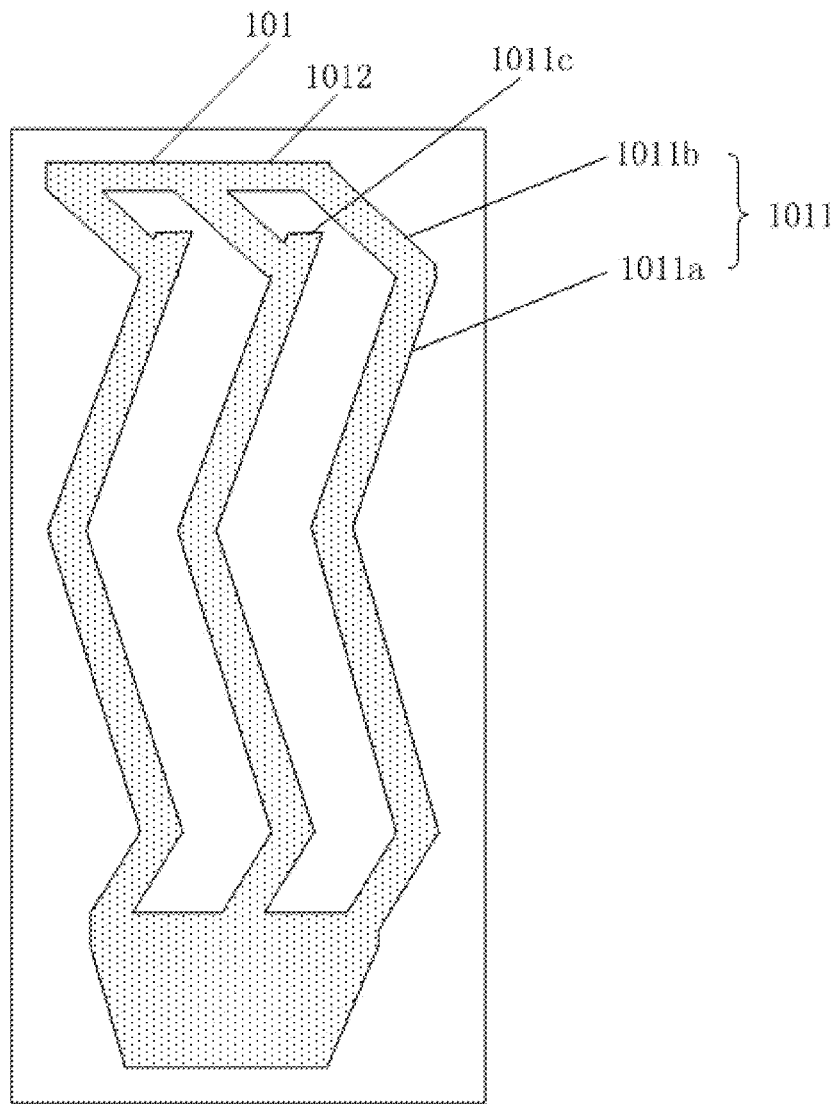
FIG. 10 is a schematic view of a pixel unit of a liquid crystal display device with the FFS mode according to a third embodiment of the invention.

FIG. 10 is a schematic view of a pixel unit of a liquid crystal display device with the FFS mode according to a third embodiment of the invention. As shown in FIG. 10, a pixel electrode 101 of the pixel unit is a two-domain pixel electrode, and a branch electrode 1011 of the pixel electrode 101 includes a body 1011a of a polyline form and an inclined connection part 1011b connected between the body 1011a and an end electrode 1012. A protrusion 1011c is arranged at an end of the body 1011a, and the protrusion 1011c and the body 1011a near its end extend in the same direction, i.e. along the same line.

In the present embodiment, preferably, an additional protrusion 1011c may be further arranged at the lower end of the body 1011a.

Meanwhile, it should be understood by those skilled in the art that the body of the branch electrode may have an existing shape, such as a polyline shape, or a fishbone shape, as desired.

The structure of the protrusion for suppressing the DLS phenomenon is applied to a multiple-domain pixel unit in the embodiment, thereby optimizing the display performance of the multiple-domain pixel unit.

Figure 11:
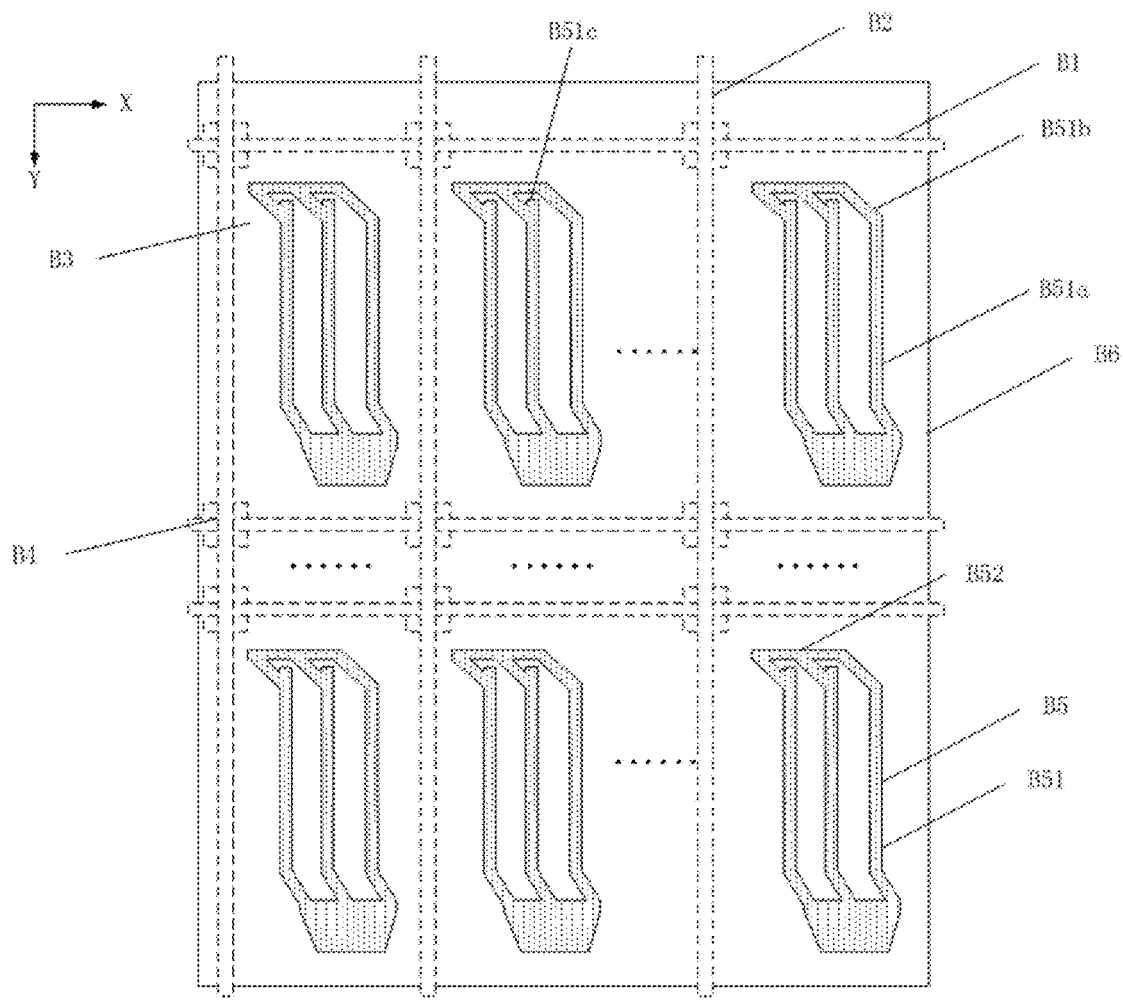
FIG. 11 is a schematic view of an array substrate of a liquid crystal display device with the FFS mode according to a fourth embodiment of the invention.

FIG. 11 is a schematic top view of an array substrate of a liquid crystal display device with the FFS mode according to a fourth embodiment of the invention. As shown in FIG. 11, an array substrate includes gate lines B1 and data lines B2 (as shown in dotted lines) intersecting with the gate lines B1, and pixel regions B3 are defined by the gate lines B1 and the data lines B2. The array substrate also includes switch devices B4 (as shown in dotted lines) arranged at intersection positions of the gate lines B1 and the data lines B2, pixel electrodes B5 in the pixel regions B3, and a common electrode B6 covering the array substrate, where the pixel electrodes B5 are insulated from the common electrode B6.

The pixel electrode B5 includes at least two branch electrodes B51 arranged in parallel and an end electrode B52 connecting with ends of the branch electrodes B51.

The branch electrode B51 includes a body B51a and an inclined connection part B51b, where the inclined connection part B51b is connected between an end of the body B51a and the end electrode B52, and the inclined connection part B51b and the body B51a extend along different directions and form an inclined angle α therebetween. In this embodiment, preferably, the angle α is less than or equal to 60 degree.

At least one of the branch electrodes B51 further includes a protrusion B51c at an end of the body B51a. The protrusion B51c is arranged opposite to the end electrode along a direction different from the extension direction of the inclined connection part B51b. The protrusion B51c, the body B51a and the inclined connection part B51b may be transparent conductive patterns integrally formed on a same plane through a patterning process.

In this embodiment, the protrusion B51c and the body B51a of the branch electrode B51 extend in the same direction, i.e. along the same line.

The protrusion B51c and the end electrode B52, which are arranged opposite to each other, form opposite electric field components in the Y direction (i.e. Y axis) with the common electrode, respectively, and the electric field component in the Y direction formed by the protrusion B51c with the common electrode partially counteracts that formed by the end electrode B52 with the common electrode, to decrease the electric field component in the Y direction at an edge region of the pixel unit, thereby suppressing the DLS phenomenon and decreasing an area of the region suffering from the DLS phenomenon.

In this embodiment, the common electrode B6 is a planar electrode. Meanwhile, both the pixel electrode B5 and the common electrode B6 may be transparent electrodes, which may be made of Indium Tin Oxide (ITO), Indium Zinc Oxide (IZO), a combination thereof or other transparent conductive materials. An insulation layer can be disposed between the pixel electrode B5 and the common electrode B6 for insulating (not shown in FIG. 11).

The structure of the pixel electrode of the array substrate described in this embodiment is the same as that of the pixel electrode in the pixel unit in the first embodiment described above. However, it should be understood by those skilled in the art that the structures of the pixel electrodes of the pixel units described in the second embodiment and the third embodiment can be applied to the array substrate of the fourth embodiment, thereby suppressing the electric field component in the Y direction and decreasing an area of the region of the liquid display device that suffers from the DLS phenomenon.

In an aspect of the present invention, the protrusion is arranged at the connection position between the body and the inclined connection part of at least one branch electrode of the pixel electrode, and is used to suppress the electric field in the Y axis caused by the end electrode, thereby preventing the occurrence of the DLS phenomenon in the vicinity of the edge of the pixel unit.

The preferable embodiments of the present invention have been described above, but are not intended to limit the present invention. Various modifications and variations may be made to the present invention by those skilled in the art. Thus, all these modifications, substitutions and improvements are intended to be included in the present invention if they fall within the scope of the invention.

What is claimed is:

1. A pixel unit of a liquid crystal display device with a Fringe Field Switching mode comprising a pixel electrode and a common electrode, which are insulated from each other, wherein,
the pixel electrode includes at least two branch electrodes arranged in parallel and an end electrode connecting to ends of the branch electrodes;
the branch electrode includes a body and an inclined connection part, wherein, the inclined connection part is connected between an end of the body and the end electrode, and extends in a direction different from the extension direction of the body;
at least one of the branch electrodes further includes a protrusion at an end of the body;
the protrusion is arranged opposite to the end electrode along the extension direction of the body.

2. The pixel unit of claim 1, wherein, the protrusion is provided for each of the branch electrodes, which includes the body with an end opposite to the end electrode.

3. The pixel unit of claim 1, wherein, an angle formed between an extension direction of the body and an extension direction of the inclined connection part is less than or equal to 60 degree.

4. The pixel unit of claim 1, wherein, the body of the branch electrode has a strip shape, a zigzag shape, or a fishbone shape.

5. The pixel unit of claim 1, wherein, each of the pixel electrode and the common electrode is a transparent electrode.

6. An array substrate of a liquid crystal display device with a Fringe Field Switching mode, comprising:
gate lines and data lines intersecting with the gate lines, the gate lines and the data lines defining pixel regions;
switch devices arranged at intersection positions of the gate lines and the data lines;
a pixel electrode located in the pixel region; and
a common electrode covering the array substrate, where the pixel electrode is insulated from the common electrode;
the pixel electrode includes at least two branch electrodes arranged in parallel and an end electrode connecting to ends of the branch electrodes;
the branch electrode includes a body and an inclined connection part, wherein, the inclined connection part is connected between an end of the body and the end electrode, and the inclined connection part and the body extend in different directions;
at least one of the branch electrodes further includes a protrusion located at an end of the body, and the protrusion is arranged opposite to the end electrode along the extension direction of the body.

7. The array substrate of claim 6, wherein, the protrusion is provided for each of the branch electrodes, which includes the body with an end opposite to the end electrode.

8. The array substrate of claim 6, wherein, an angle formed between an extension direction of the body and an extension direction of the inclined connection part is less than or equal to 60 degree.

9. The array substrate of claim 6, wherein, the body of the branch electrode has a strip shape, a zigzag shape, or a fishbone shape.

10. The array substrate of claim 6, wherein, each of the pixel electrode and the common electrode is a transparent electrode.

* * * * *